United States Patent Office 3,373,162
Patented Mar. 12, 1968

3,373,162
PREPARATION OF SUBSTITUTED
PIPERAZINIUM SALTS
Clarence R. Dick, Lake Jackson, Tex., assignor to The Dow Chemical Company, Midland, Mich., a corporation of Delaware
No Drawing. Filed Nov. 16, 1965, Ser. No. 508,138
6 Claims. (Cl. 260—268)

ABSTRACT OF THE DISCLOSURE

Substituted piperazinium halides are made by the reaction of an N-substituted aziridine with an alkylating agent in the presence of a source of halogen ion.

---

This invention relates to a process for preparing 1,1,4-trisubstituted piperazinium salts.

The preparation of piperazine by dimerization of aziridine (ethylenimine) has long been known to the art. Quite logically, the preparation of substituted piperazininum salts has proceeded from substituted piperazines. But the latter reactions are less than satisfactory for commercial practice because they are multi-step, give only moderate yields, and produce a variety of by-products.

It has now been discovered that 1,1,4-trisubstituted piperazinium halides can be obtained by a single-step process in high yields essentially free of undesired by-products. These piperazinium salts are useful as curing agents for epoxy resins. They are also useful as intermediates and for their activities in modified degrees in the medical and veterinary appliactions for the piperazines.

This novel process in its broadest aspect comprises the reaction of an N-substituted aziridine with an alkylating agent in the presence of or including a halogen in accord with the following reaction scheme:

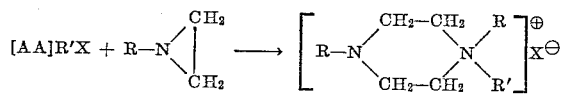

R above is a hydrocarbon radical conferring on the N-substituted aziridine a $K_B$ value greater than $10^{-8}$, [AA] is an alkylating agent supplying R' and X, R' is a mono- or divalent hydrocarbon radical having its valence or valences on an aliphatic carbon atom and containing 1 through 20 carbon atoms, and X is chlorine, bromine or iodine.

The hydrocarbon substituent on the aziridine nitrogen can be defined in terms of the $K_B$ value of the thus substituted aziridine in view of the discovery that aziridines having relatively low $K_B$ values were substantially inoperative in this process. For example, cyanoethylaziridine ($K_B = 2.8 \times 10^{-9}$) will produce only polymerized products. Other compounds, such as 2-acetoxyethyl aziridine ($K_B = 3.5 \times 10^{-8}$) are operative but only in low yields. On the other hand, illustrative of the reactions of this invention, N-ethyl arizidine ($K_B = 8.1 \times 10^{-7}$) delivers nearly quantitative yields of piperazine products.

The N-substituent is thus constituted as desired within the foregoing limitation to give the appropriate substituent at R on the piperazine nucleus. Advantageously, R is a hydrocarbon group containing 1 to about 10 carbon atoms, such as cycloalkyl (e.g., cyclopentyl, cyclohexyl), alkenyl (e.g., allyl, vinyl), alkynyl (e.g., ethynyl propynyl), aralkyl (e.g., benzyl, phenylethyl), aryl (e.g., phenyl) and the like. Preferred, however, are the alkyl groups containing 1 to about 10 carbon atoms (e.g., methyl, ethyl, propyl, isopropyl, butyl, decyl, secbutyl, t-butyl and the like).

A principal difficulty in conducting the conversion of N-substituted aziridines to substituted piperazinium salts is averting polymerization to a polyaziridine as the dominant reaction. Studies in conjunction with this invention have shown the necessity for the halide ion in piperazine formation, and this is conveniently supplied in the form of the anion constituent of the selected hydrocarbon halide alkylating agent or by a metal halide accompanying a non-halide alkylating agent. In present context, therefore, the term "alkylating agent" includes conventional non-halide alkylating materials employed in the presence of a halide as well as conventional alkylating materials which are themselves halides. For example, such alkylating agents include the hydrocarbon halides of the type R'X, in which R' is the desired hydrocarbon radical to be introduced as the R' substituent of the piperazinium salt. R' can be alkyl, alkenyl or aralkyl as defined above. It is to be noted that the benzene nucleus of the aralkyl groups can contain halide, nitro, ether and other non-reactive substituents where such is desired in the final piperazinium product. Such alkylating agents also include the arylsulfonates (e.g., benzenesulfonate) and substituted arylsulfonates (e.g., p-toluenesulfonate, p-chlorobenzenesulfonate, p-nitrobenzenesulfonate, p-methoxybenzenesulfonate and the like), in the essential presence of a metal halide such as sodium or potassium iodide.

The reaction will proceed at temperatures above about $-10°$ C., e.g., to the boiling temperature of the reaction mixture at atmospheric pressure, although a range of about 20 to about 60° C. is preferred. Such reaction should generally be permitted to continue until the halide has been substantially consumed in order to maximize yields. Progress of the reaction is conveniently checked at intervals by gas-liquid chromatography. A reaction time of ten minutes to 18 hours is generally employed.

Presence of the N-substituted aziridine in moderate excess favors high yields. While stoichiometric amounts of the N-substituted aziridine and halide (i.e., two moles and one mole, respectively) are operative, a molar ratio of about 6:1 to 12:1 of N-substituted aziridine to halide produces a more satisfactory reaction. Excess N-substituted aziridine beyond a molar ratio of about 12:1 is generally to be avoided because of product loss during recovery and, on occasions, the formation of polymeric by-products. A ratio of about 10:1 preferred.

In general, non-aqueous solvents for the reactants are preferred. The usual organic solvents, such as the lower alcohols (e.g., ethanol, propanol) and ketones (e.g., acetone, methylethyl ketone), are normally acceptable. Water alone is to be avoided as favoring polymerization, although the presence of small amounts usually can be tolerated. No special sequence of mixing need be observed, and recovery of the reaction product is by conventional methods.

An outstanding feature of this reaction is the high yields of product obtained. Based on starting halide, yields generally are above 50 percent and in most cases exceed 90 percent or are virtually quantitative, as will be noted below.

The following examples illustrate the process of this invention but are not intended to limit its scope.

*Example 1.—1,1,4-triethylpiperazinium bromide*

A reaction vessel equipped with means for stirring and temperature control was charged with 25.6 gm. of N-ethyl aziridine and 36 ml. of dry acetone. To this mixture was added 2.25 gm. of ethyl bromide. The temperature was maintained at 25° C. for 8 hours. As the reaction proceeded the solution became cloudy, and a precipitate formed and settled to the bottom of the vessel. This precipitate was removed by filtration, washed with diethyl ether and dried to give 7.48 gm. (99+ percent of theoretical) of 1,1,4-triethylpiperazinium bromide, M.P. 202–205° C. Analysis:

nitrogen found, 11.21 percent;
nitrogen calculated, 11.15 percent.

*Example 2.—1,4-diethyl-1-methylpiperazinium iodide*

To 100 ml. of dry acetone was added 0.36 mole (25.6 gm.) of 1-ethylaziridine, 0.036 mole (5.5 gm.) of sodium iodide and 0.036 mole (6.84 gm.) of methyl p-toluenesulfonate. The temperature of the mixture was maintained at 30–35° C. by cooling the exothermic reaction and was then held at room temperature for 12 hours. Acetone (400 ml.) was added to the reaction mixture, which was then filtered to give a white precipitate of sodium p-toluenesulfonate. The acetone extract was evaporated to give a pale yellow gum which was converted to a solid precipitate by repeated washings with ethyl ether. Analysis showed the solid product to be 1,4-diethyl-1-methylpiperazinium iodide in 98 percent yield and 96 percent purity.

Following specifically the procedure of Example 1, other reactions were conducted and products obtained as follows:

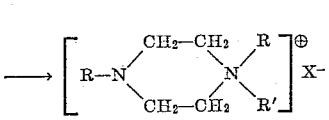

| Examples | R'X (A) | [R—] (B) | Molar Ratio (B):(A) | Reaction Temp., °C. | Product | Percent Yield [1] | M.P., °C. |
|---|---|---|---|---|---|---|---|
| Example 3 | Allyl bromide | n-Ethyl | 10:1 | 25 | 1,4-diethyl-1-allylpiperazinium bromide | 98 | |
| Example 4 | do | do | 10:1 | 40 | do | 94 | 152–154 |
| Example 5 | 1,4-dichloro-2-butene | do | 20:1 | 40 | 1,4-but-2-enebis(1,4-diethylpiperazinium chloride) | 88 | 197–200 |
| Example 6 | Allyl chloride | do | 10:1 | 40 | 1,4-diethyl-1-allylpiperazinium chloride | 96 | 140–143 |
| Example 7 | Allyl bromide | do | 10:1 | 25 | 1,4-diethyl-1-allylpiperazinium bromide | 80 | 105–109 |
| Example 8 | Butyl bromide | do | 10:1 | 25 | 1,4-diethyl-1-butylpiperazinium bromide | 96 | |
| Example 9 | Allyl chloride | do | 10:1 | 25 | 1,4-diethyl-1-allylpiperazinium chloride | 91 | |
| Example 10 | α,α'-dibromoxylene | do | 20:1 | 25 | α,α'-xylenebis(1,4-diethylpiperazinium bromide) | [2] 99 | 197–200 |
| Example 11 | Methyl iodide | do | 10:1 | 25 | 1,4-diethyl-1-methylpiperazinium iodide | 91 | 143–145 |
| Example 12 | Ethyl iodide | do | 10:1 | 25 | 1,4-triethylpiperazinium iodide | 98 | 146–148 |
| Example 13 | n-Dodecyl bromide | do | 10:1 | 25 | 1,4-diethyl-1-dodecylpiperazinium bromide | 92 | 150 |
| Example 14 | Allyl bromide | do | 10:1 | 25 | 1,4-dibutyl-1-allylpiperazinium bromide | 95 | 134–136 |
| Example 15 | do | do | 10:1 | 40 | do | 96 | 134–135.5 |
| Example 16 | Allyl chloride | do | 10:1 | 25 | 1,4-dibutyl-1-allylpiperazinium chloride | 94 | 151–154 |
| Example 17 | Allyl bromide | 2-phenylethyl | 10:1 | 40 | 1,4-(2-phenylethyl)-1-allylpiperazinium bromide | 93 | 161–164 |
| Example 18 | Allyl chloride | do | 10:1 | 25 | 1,4-(2-phenylethyl)-1-allylpiperazinium chloride | 85 | 161–163 |
| Example 19 | Allyl chloride +sodium iodide | do | 10:1 | 25 | do | 99 | 163–165 |
| Example 20 | Ethyl bromide | Methyl | 10:1 | 25 | 1,4-dimethyl-1-ethylpiperazinium bromide | 99 | 155–157 |
| Example 21 | do | n-Decyl | 10:1 | 25 | 1,4-decyl-1-ethylpiperazinium bromide | 90 | 193–196 |
| Example 22 | Chloroacetone | n-Ethyl | 10:1 | 25 | 1,4-diethyl-1-methylacetopiperazinium chloride | 75 | 177–179 |
| Example 23 | 1,6-dibromohexane | do | 20:1 | 25 | 1,6-hexanebis(1,4-diethylpiperazinium bromide) | 92 | 236–238 |

[1] Recovered product based on moles of halide. [2] At 21 percent conversion of α,α'-dibromoxylene.

To one skilled in the art, it will be apparent from the foregoing description that selection of the N-substituent on the aziridine nucleus is not critical so long as it is essentially non-reactive under process conditions. It will also be clear that the process itself, while advantageously embodying obvious modifications with different alkylating agents, follows the exemplified reactions closely for all reactants within the scope disclosed.

What is claimed is:

1. A process for preparing a 1,1,4-trisubstituted piperazinium halide which comprises: reacting (1) an N-substituted aziridine of the formula

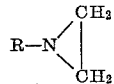

wherein R is a hydrocarbon radical conferring on said N-substituted aziridine a $K_B$ value greater than about $10^{-8}$, with (2) an alkylating agent of the formula

R'X

R' being a mono- or divalent hydrocarbon radical having its valance or valences on an aliphatic carbon atom and containing 1 through 20 carbon atoms, and X is chlorine, bromine or iodine, to give a 1,1,4-trisubstituted piperazinium salt of the formula

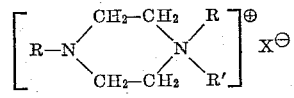

wherein R, R' and X are as above defined.

2. The process of claim 1 wherein the reaction is conducted at a temperature above about $-10°$ C.
3. The process of claim 1 wherein the mole ratio of aziridine to halide is 1:1 to 12:1.
4. The process of claim 1 wherein R is alkyl and R'X is an alkyl halide, said alkyl groups having 1 through 20 carbon atoms.
5. The process of claim 4 wherein the reaction is conducted with a molar excess of about 6:1 to about 12:1 N-substituted aziridine over alkyl halide.
6. A process for preparing a 1,1,4-trisubstituted piperazinium halide which comprises: (1) reacting (a) an N-substituted aziridine of the formula

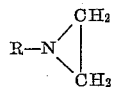

wherein R is an alkyl radical containing from 1 to about 20 carbon atoms conferring on said N-substituted aziridine a $K_B$ value greater than about $10^{-8}$, with (b) a halide of the formula R'X, wherein R' is an alkyl, alkenyl or aralkyl radical containing from 1 to about 20 carbon atoms, and X is chlorine, bromine or iodine, the molar ratio of N-substituted aziridine to halide being about 6:1 to 12:1, at a temperature between about 20 and about 60° C. and in a non-aqueous solvent, said reaction being permitted to continue until substantially all the halide has been consumed, and (2) separating from the reaction mixture the thus-formed 1,1,4-tri-substituted piperazinium halide of the formula

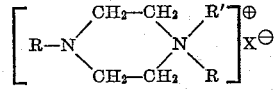

wherein R, R' and X are as above defined.

No references cited.

HENRY R. JILES, *Primary Examiner.*